United States Patent [19]
Herzog

[11] Patent Number: 5,358,091
[45] Date of Patent: Oct. 25, 1994

[54] BOTTLE UNSCRAMBLER

[76] Inventor: Kenneth J. Herzog, 200 Mill Rd., Riverhead, N.Y. 11901

[21] Appl. No.: 84,163

[22] Filed: Jun. 30, 1993

[51] Int. Cl.⁵ .............................................. B65G 47/24
[52] U.S. Cl. .................................... 198/399; 198/400
[58] Field of Search ............................. 198/399, 400

[56] References Cited

U.S. PATENT DOCUMENTS

| 4,148,390 | 4/1979 | Ionescu | 198/399 |
| 4,271,954 | 6/1981 | Gosney | 198/399 |
| 4,463,846 | 8/1984 | Ionescu | 198/399 |
| 4,483,435 | 11/1984 | Ionescu | 198/399 |
| 4,790,423 | 12/1988 | Hegarty et al. | 198/400 |
| 4,844,233 | 7/1989 | Aidlin et al. | 198/399 X |
| 4,854,442 | 8/1989 | Krooss | 198/400 |

*Primary Examiner*—Cheryl L. Gastineau

[57] ABSTRACT

An automatic bottle unscrambler is provided located between a rotary bottle pre-feeder and a take-away conveyor, which contains a mechanism that will position each bottle in an upright position, when passing through for the next downstream operation. The mechanism is adjustable to both the width and height of various sized bottles.

4 Claims, 2 Drawing Sheets

BOTTLE UNSCRAMBLER

BACKGROUND OF THE INVENTION

The instant invention relates generally to container orientation devices and more specifically it relates to an automatic bottle unscrambler, which provides provides a mechanism which will position each bottle in an upright position.

There are available various conventional container orientation devices which do not provide the novel improvements of the invention herein disclosed.

SUMMARY OF THE INVENTION

A primary object of the present invention is to provide an automatic bottle unscrambler that will overcome the shortcomings of the prior art devices.

Another object is to provide an automatic bottle unscrambler located between a rotary bottle pre-feeder and a take-away conveyor that will position each bottle in an upright position when passing through for the next down stream operation.

An additional object is to provide an automatic bottle unscrambler that is adjustable to both the width and height of various sized bottles.

A further object is to provide an automatic bottle unscrambler that is simple and easy to use.

A still further object is to provide an automatic bottle unscrambler that is economical in cost to manufacture.

Further objects of the invention will appear as the description proceeds.

To the accomplishment of the above and related objects, this invention may be embodied in the form illustrated in the accompanying drawings, attention being called to the fact, however, that the drawings are illustrative only, and than changes may be made in the specific construction illustrated and described within the scope of the appended claims.

BRIEF DESCRIPTION OF THE DRAWING FIGURES

DETAILED DESCRIPTION OF THE PREFERRED EMBODIMENTS

Figure 1:
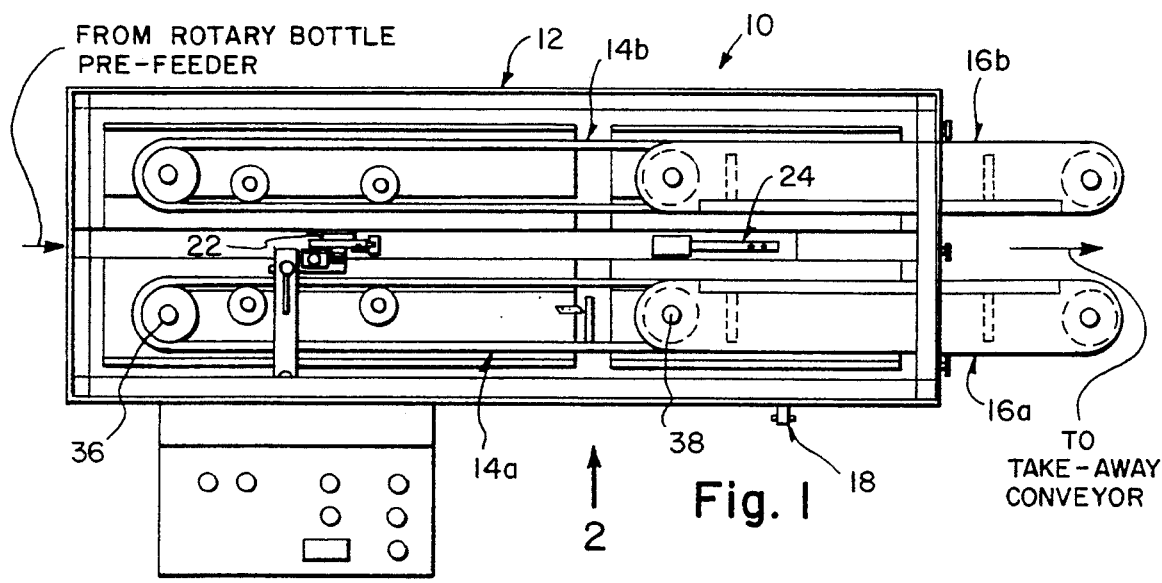
FIG. 1 is a top view of the instant invention.
Figure 2:
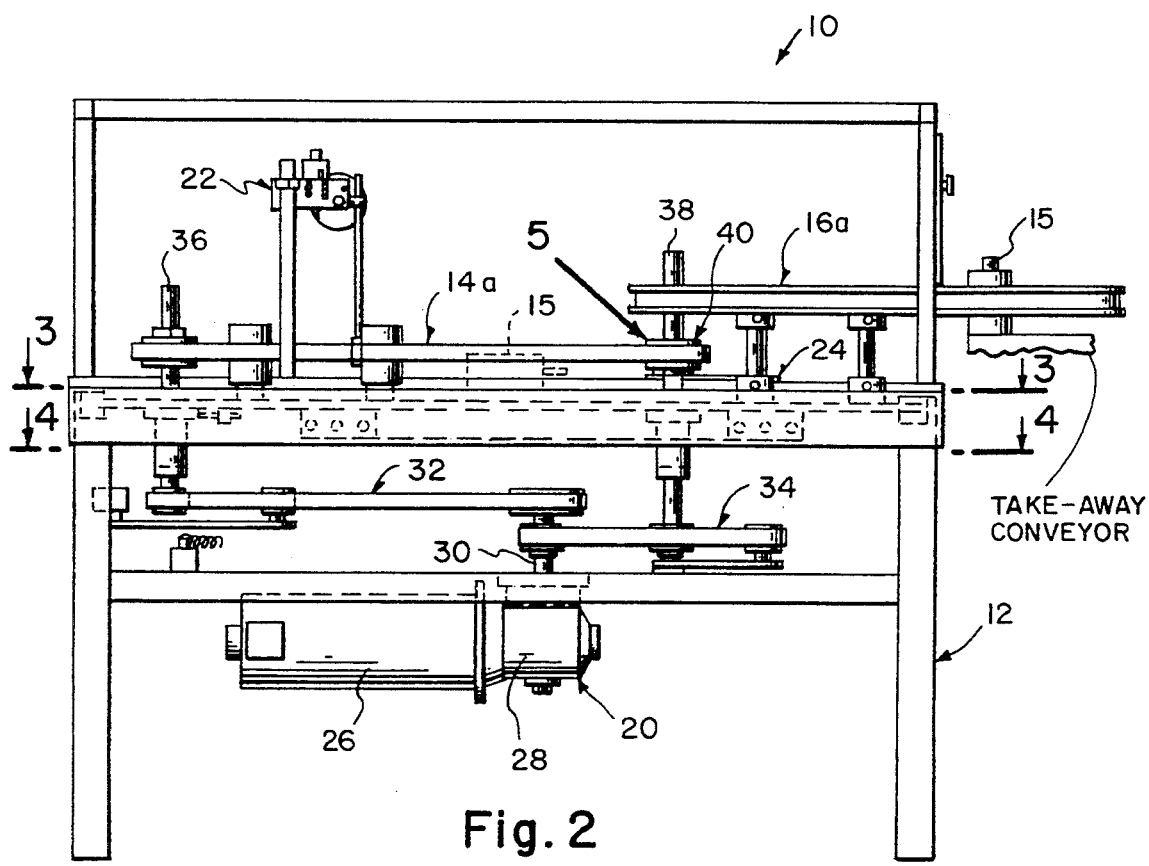
FIG. 2 is a front view taken in direction of arrow 2 in FIG. 1.
Figure 3:
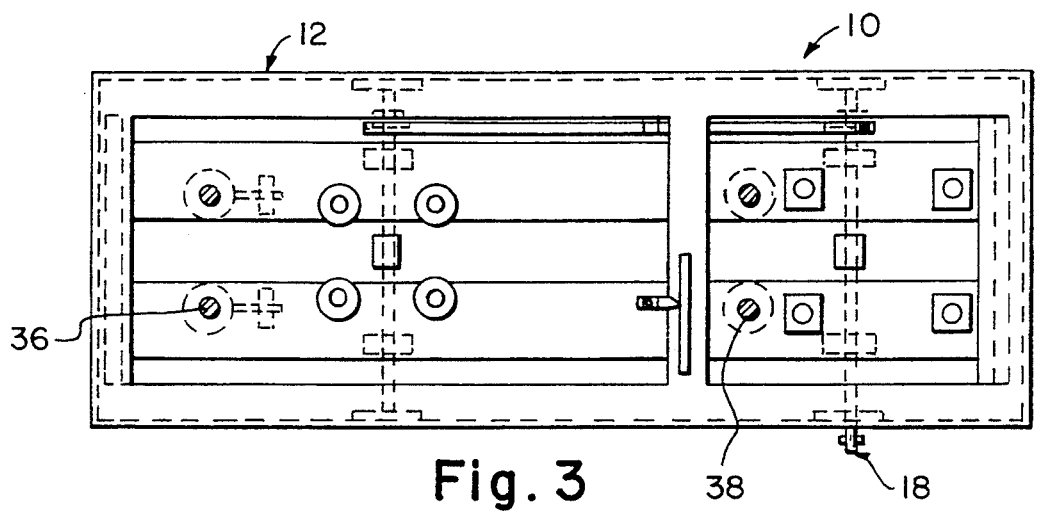
FIG. 3 is a cross sectional view taken along line 3—3 in FIG. 2.
Figure 4:
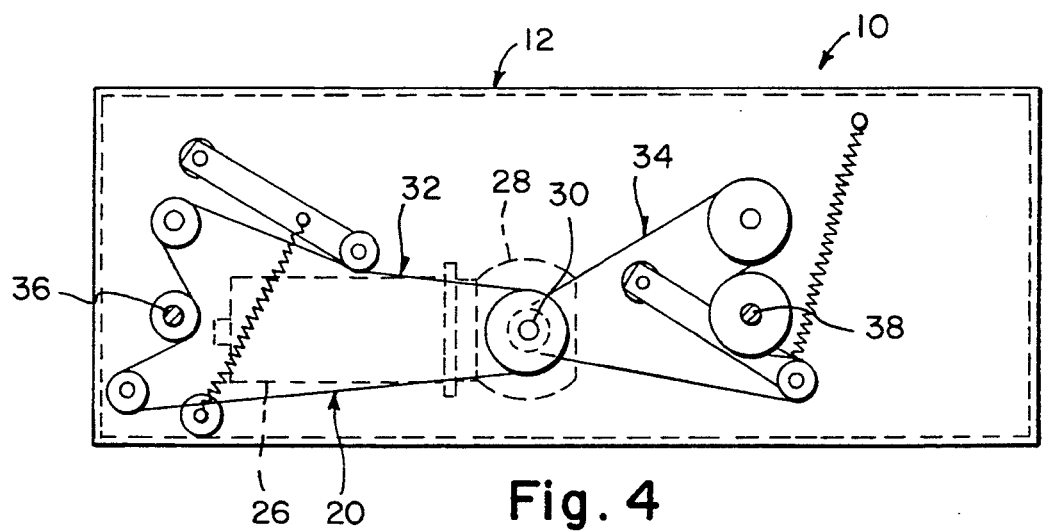
FIG. 4 is a cross sectional view taken along line 4—4 in FIG. 2.

Turning now descriptively to the drawings, in which similar reference characters denote similar elements throughout the several views, FIGS. 1 through 4 illustrate an automatic bottle unscrambler 10 positioned between rotary bottle pre-feeder and a take-away conveyor (not shown) which consists of a frame support 12. A pair of height adjustable intake carrier belt assemblies 14a, 14b are spaced apart on the frame support 12 adjacent to the rotary bottle pre-feeder on opposite sides of the center of travel bottles 15 coming from the rotary bottle pre-feeder. A pair of height adjustable discharge carrier belt assemblies 16a, 16b are spaced apart on the frame support 12 at a height higher than the intake carrier belt assemblies 14a, 14b adjacent to and overhang the take-away conveyor opposite sides of the center of travel of the bottles 15 going to the take-away conveyor. Threaded rod structures 18 are in the frame support 12, for manually adjusting the width between the intake carrier belt assemblies 14a, 14b and the discharge carrier belt assemblies 16a, 16b simultaneously, so as to get proper side pressure gripping action on the bottles 15. A drive assembly 20 is in the frame support 12 to operate one of the intake carrier belt assemblies 14a and one of the discharge carrier belt assemblies 16a, so as to move the bottles 15 therethrough. A bottle limiter 22 is mounted onto the frame support 12, which extends over and between the intake carrier belt assemblies 14a, 14b. The bottle lifter 22 has a pivot arm with a hook which engages each bottle neck and 22 will pivot any bottle 15 to an upright position, if the neck of the bottle is leading and will ride over the bottle 15, if the neck of the bottle is trailing. A bottle kicker 24 is mounted to the frame support 12 between the discharge carrier belt assemblies 16a, 16b. The bottle kicker block 24 will engage and stand up all of the bottles 15 where the neck is trailing, so that the discharge carrier belt assemblies 16a, 16b can carry the bottles 15 in upright positions to the take-away conveyor.

The drive assembly 20 includes a motor 26 mounted to the frame support 12. A gear box 28 is coupled to the motor 26, while a main drive shaft 30 extends form the gear box 28. An intake timing belt unit 32 and a discharge timing belt unlit 34 are both operable by the main drive shaft 30. An intake drive shaft 36 extends between the intake timing belt unit 32 and one end of the intake carrier belt assembly 14a. A discharge drive shaft 38 extends between the discharge timing belt unit 34 and one end of the discharge carrier belt assembly 16a. A belt idler pulley assembly 40 is mounted on the discharge drive shaft 38 and is connected to a second end of the intake carrier belt assembly 14a.

Figure 5:
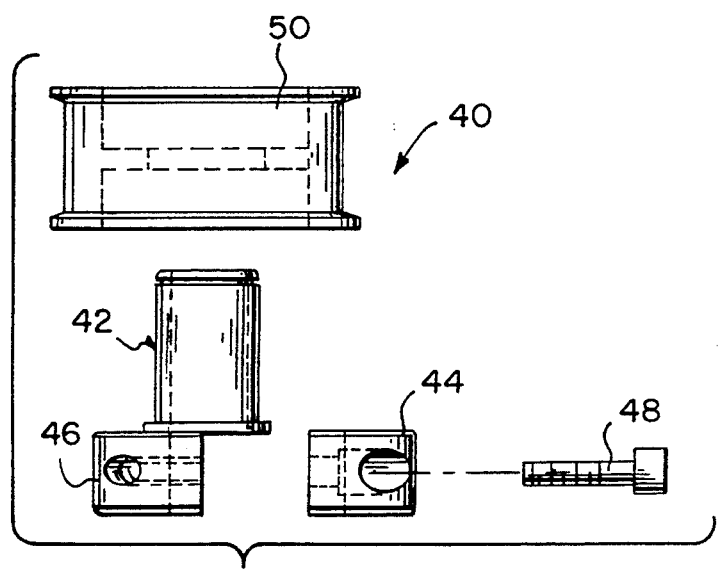
FIG. 5 is an exploded elevational view of the belt idler assembly as indicated by arrow 5 in FIG. 2.

The belt idler pulley assembly 40, as best seen in FIG. 5, contains a hub 42 to fit upon the discharge drive shaft 38. A clamp 44 fits about the discharge drive shaft 38 against a portion 46 of the hub 42. A pair of fasteners 48 are provided, to hold the clamp 44 to the hub 42 for retaining the hub 42 in a stationary position on the discharge drive shaft 38. A pulley 50 rotatably fits upon the hub 42, so that the pulley 50 can turn about the hub 42 independently from the discharge drive shaft 38.

OPERATION OF THE INVENTION

Bottles are randomly dumped into the rotary bottle prefeeder. As the pre-feeder turns the bottles are single filed dropped down an adjustable slide chute to the unscrambler. The intake carrier belt assemblies start to carry the through. If a neck of a bottle is leading, the bottle lifter locates the neck and stands the bottle up. If the neck trailing, the bottle lifter rides over the bottle, after which the bottle kicker stands up the bottles. The discharge carrier belt assemblies now catches the bottles and carries them to the take-away conveyor for the next downstream operation.

While certain novel features of this invention have been shown and described and are pointed out in the annexed claims, it will be understood that various omissions, substitutions and changes in the forms and details of the device illustrated and in its operation can be made by those skilled in the art without departing from the spirit of the invention.

What is claimed is:

1. An automatic bottle unscrambler positioned between a rotary bottle pre-feeder and a take-away conveyor which comprises:
   a) a frame support;
   b) a pair of intake carrier belt assemblies spaced apart on said frame support adjacent to the rotary bottle pre-feeder on opposite sides of the center of travel of bottles coming from the rotary bottle pre-feeder;
   c) a pair of discharge carrier belt assemblies spaced apart on said frame support at a height higher than said intake carrier belt assemblies, adjacent to and overhanging the take-away conveyor on opposite sides of the center of travel of the bottles going to the take-away conveyor;
   d) means in said frame support for manually adjusting the width between said intake carrier belt assemblies and said discharge carrier belt assemblies simultaneously, so as to get a proper side pressure gripping action on the bottles;
   e) a drive assembly in said frame support to operate one of said intake carrier belts assemblies and one of said discharge carrier belt assemblies, so as to move the bottles therethrough;
   f) a bottle lifter mounted onto said frame support, which extends over and between said intake carrier belt assemblies, whereby said bottle lifter has means to engage a bottle neck and pivot any bottle to an upright position if the neck of the bottle is leading and will ride over the bottle body if the neck of the bottle is trailing; and
   g) a bottle kicker mounted to said frame support between said discharge carrier belt assemblies, whereby said bottle kicker is adapted to engage a bottle body to stand up each bottle with the neck trailing, so that said discharge so that said discharge carrier belt assemblies can carry all the bottles in upright positions to the take-away conveyor.

2. An automatic bottle unscrambler as recited in claim 1, wherein said drive assembly includes:
   a) a motor mounted to said frame support;
   b) a gear box coupled to said motor;
   c) a main drive shaft extending from said gear box;
   d) an intake timing belt unit operable by said main drive shaft;
   e) a discharge timing belt unit operable by said main drive shaft;
   f) an intake drive shaft extending between said intake timing belt unit and one end of said intake carrier belt assembly;
   g) a discharge drive shaft extending between said discharge timing belt unit and one end of said discharge carrier belt assembly; and
   h) a belt idler pulley assembly mounted on said discharge drive shaft and connected to a second end of said intake carrier belt assembly.

3. An automatic bottle unscrambler as recited in claim 2, wherein said belt idler pulley assembly includes:
   a) a hub to fit upon said discharge drive shaft;
   b) a clamp to fit about said discharge drive shaft against a portion of said hub;
   c) a pair of fasteners to hold said clamp to said hub for retaining said hub in a stationary position on said discharge drive shaft; and
   d) a pulley to rotatably fit upon said hub, so that said pulley can turn about said hub independently from said discharge drive shaft.

4. An automatic bottle unscrambler as recited in claim 2, including means for adjusting the width between carrier belts by threaded rods mounted on said frame supports.

* * * * *